(12) United States Patent
Martin et al.

(10) Patent No.: US 8,072,383 B1
(45) Date of Patent: Dec. 6, 2011

(54) NAVIGATION AND POSITION DETERMINATION WITH A MULTICARRIER MODULATION SIGNAL OF OPPORTUNITY

(75) Inventors: Richard K. Martin, Springboro, OH (US); Jamie S. Velotta, Athens, AL (US); John F. Raquet, New Carlisle, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 261 days.

(21) Appl. No.: 12/471,525

(22) Filed: May 26, 2009

Related U.S. Application Data (60) Provisional application No. 61/132,340, filed on May 30, 2008.

(51) Int. Cl.
*G01S 1/24* (2006.01)
*G01S 3/02* (2006.01)

(52) U.S. Cl. ........................................ 342/387; 342/463
(58) Field of Classification Search .................. 342/387, 342/463–465
See application file for complete search history.

(56) References Cited

U.S. PATENT DOCUMENTS 6,094,168 A * 7/2000 Duffett-Smith et al. ...... 342/463
6,492,945 B2 * 12/2002 Counselman et al. ........ 342/464

OTHER PUBLICATIONS

J.S. Velotta, "Navigation Using Orthogonal Frequency Division Multiplexed Signals of Opportunity" Master's thesis, Air Force Institute of Technology, Wright-Patterson AFB, OH, Sep. 2007.*

K.A. Fisher, "The navigation potential of signals of opportunity-based time difference of arrival measurements" Ph.D. dissertation, Air Force Inst of Technology, Wright-Patterson AFB, OH, Mar. 2005.*

Martin, R.K.; Velotta, J.S.; Raquet, J.F.; "Bandwidth Efficient Cooperative TDOA Computation for Multicarrier Signals of Opportunity", IEEE Transactions on Signal Processing, vol. 57, Issue 6, 2009.*

Martin, R.K.; Velotta, J.S.; Raquet, J.F.; "Multicarrier Modulation as a Navigation Signal of Opportunity", 2008 IEEE Aerospace Conference, 2008.*

* cited by examiner

*Primary Examiner* — Thomas Tarcza
*Assistant Examiner* — Cassie Galt
(74) *Attorney, Agent, or Firm* — Charles Figer; AFMCLO-JAZ

(57) ABSTRACT

A multicarrier modulation position determination method that includes deploying at least one known receiver with a known location and a second receiver with an unknown location. At least two signals of opportunity with different locations are obtained by both the receiver and the second receiver. The signals having a plurality of block data, the block data having block boundaries. The block boundaries including a beginning block boundary and an end block boundary. The block data further including a cyclic prefix at the beginning block boundary. Acquiring a plurality of data samples for at least a portion of the block data and correlating the attained signal of opportunity between the receivers. The correlating process includes the calculation of a time difference of arrival between the known receiver and the second receiver. The time difference of arrival is calculated by aligning the block boundaries and computing a single scalar statistical feature associated with each block. The location of the second receiver is calculated by using a plurality of single scalar statistical features.

5 Claims, 6 Drawing Sheets

The geometry of TDOA computation

The geometry of TDOA computation

NAVIGATION AND POSITION DETERMINATION WITH A MULTICARRIER MODULATION SIGNAL OF OPPORTUNITY

This application claims the benefit of provisional application 61/132,340 filed May 30, 2008 under the provisions of 35 U.S.C. §119(e).

RIGHTS OF THE GOVERNMENT

The invention described herein may be manufactured and used by or for the Government of the United States for all governmental purposes without the payment of any royalty.

BACKGROUND OF THE INVENTION

The invention relates to using multicarrier modulation navigation with at least one signal of opportunity.

The Global Positioning System (GPS) generally provides worldwide high-accuracy positioning. However, GPS requires lines of sight to multiple satellites and may be blocked or jammed, hence backup navigation techniques are of interest. Navigation via signals of opportunity uses existing radio infrastructure as ad hoc navigational beacons. A mobile receiver determines its position by computing a time difference of arrival (TDOA) between signal reception time at the mobile and at a reference receiver. The drawback is that this requires communication between the reference and mobile receivers.

Multicarrier modulation may be an ideal candidate for a navigation signal of opportunity. Communication between the reference and mobile may be very minimal for multicarrier modulation compared to other modulation types, since the block structure inherently aids synchronization of the two received signals.

Measurements that can be taken from signals of opportunity include the angle of arrival, the received power level, or the time difference of arrival (TDOA) at multiple receivers. TDOA may be preferable since it is difficult to get sufficient position accuracy from angle or power measurements. One difficulty encountered with using TDOA is that for each TDOA measurement, there must be either two transmitters sending the same signal or two spatially separated receivers measuring the same transmission. Usually only one transmitter is available for each signal of opportunity, hence a "reference receiver" may be placed at a known location, and the mobile (whose position is to be determined) must cooperate with the reference receiver. TDOA measurements generally may require some form of correlation between the two received signals.

One TDOA system is Long Range Navigation (LORAN). LORAN Operates in the low frequency band at 90 to 110 kHz. In this system, multiple synchronized transmitters radiate pulses of radio frequency energy. An airborne or shipborne receiver measures the TOGA of the pulses from the different transmitters. Each measured TDOA defines a hyperbolic line of position for the receiver. The intersection of multiple lines of position may be used to supply the location of a mobile receiver, as shown in FIG. 1a.

NAVSYS Corporation designed a navigation system which lessens the effects of GPS jamming or interference. The system uses multiple receivers at known locations to determine the position of a single transmission source; e.g. a GPS jamming device. Once the GPS interference source location is known, it can then be neutralized.

The present invention differs from these two systems. LORAN uses designated transmitters with a signal built for location identification, not signals of opportunity. The signal markers are built into the transmission in LORAN unlike the present system which uses a cyclic prefix in certain digital signals for distance calculations using block boundaries. The present invention in also uniquely computationally efficient and therefore "fast enough to be useful." The present invention is also designed to consume a small amount of the available bandwidth and therefore can operate in cooperation with the signal provider, rather than usurping the original intent of the signal.

NAVSYS is designed to locate GPS jamming with the same designated transmitters and signal limitations as observed with the LORAN system. It does not mitigate GPS outages.

SUMMARY OF THE INVENTION

A method of multicarrier modulation position determination by deploying at least one known receiver with a known location. Also deploying a second receiver with an unknown location. Obtaining at least two signals of opportunity with different locations by both the receiver and the second receiver. The signals having a plurality of block data. The block data having block boundaries. The block boundaries including a beginning block boundary and an end block boundary. The block data further including a cyclic prefix at the beginning block boundary. Acquiring a plurality of data samples for at least a portion of the block data. Correlating the attained signal of opportunity between the receivers. The correlating process including calculating a time difference of arrival between the known receiver and the second receiver. The time difference of arrival calculated by aligning the block boundaries and computing a single scalar statistical feature associated with each block. Calculating the location of the second receiver with a plurality of single scalar statistical features.

In one embodiment this may be achieved by having the known receiver (reference receiver) retransmitting much of its received signal to the second receiver (mobile receiver), using significant bandwidth. This invention discloses how multicarrier modulation may be used to ease this difficulty. Preferably, a two-step TDOA computation may be used in which we first use the block structure to align the block boundaries, and then use a feature correlation to determine the time difference in blocks.

Multicarrier systems may provide the benefit of a well-defined signal structure, in which the beginning and end of each block of data are identical. Thus, a receiver can identify block boundaries by looking for this repetition, which does not require knowledge of the transmitted signal (i.e. it is non-cooperative, or "blind"). The mobile and reference receiver can each locate the block boundaries, and can each calculate some statistical feature (e.g. mean or variance) of each block. Then the reference can transmit the sequence of block reception times and the associated feature values to the mobile, rather than retransmitting the entire signal. This leads to a significant reduction in bandwidth. Preferably the amount of bandwidth that the reference receiver uses to transmit to the mobile receiver is minimized to speed up the calculations without sacrificing locating capability.

DETAILED DESCRIPTION

Figure 1:
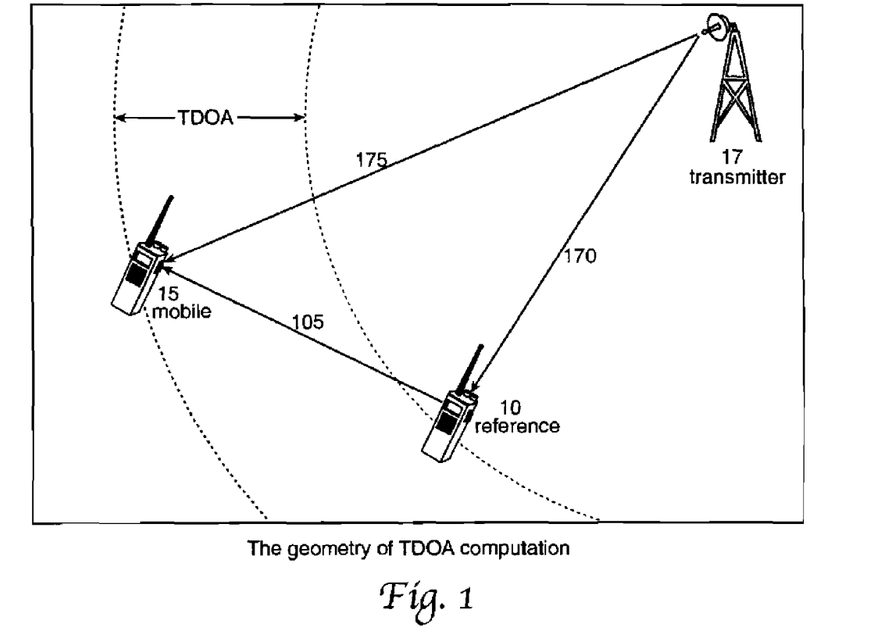
FIG. 1 is an illustration of Time Difference of arrival (TDOA) using two receivers.

The geometry of the transceivers involved in a single time difference of arrival (TDOA) computation from a signal of opportunity is depicted in FIG. 1. Preferably, either multiple transmitters or multiple reference receivers are used to obtain multiple TDOA measurements and solve for an unknown transmitter position. For simplicity, FIG. 1 shows only one transmitter 17, one mobile receiver 15 and one reference receiver 10. The reference receiver 10 also has the ability to transmit to the mobile receiver 15

A signal of opportunity (SoOP) is any radio frequency signal, which is not specifically designed for navigational purposes. Three examples of signals of opportunity include broadcast signal carrier systems such as analog television broadcasts, amplitude modulation (AM) and frequency modulation (FM) radio signals. Cellular Communications and broadcast multi-carrier systems such as satellite radio, and the European digital video broadcast (DVB) and wireless networking standards may also be signals of opportunity that can be exploited for navigational purposes.

Preferably the transmitter 17 in FIG. 1 is at a known location. More preferably the transmitter 17 is within a line of sight to the reference receiver 10 at a preferably known second location, and with a line of sight to the mobile receiver 15 whose location is to be determined.

Preferably there is a reliable communication link between the reference transmitter 17 and the mobile receiver 15, but it need not be a line of sight. The reference receiver 10 gathers information about a received signal 170 and passes a portion of the information on to the mobile receiver 15 through a reference signal 105. The mobile receiver 15 compares its received signal 175 to the reference signal 105 to compute the TDOA.

One "full knowledge" approach to TDOA computation would be to have the reference 10 rebroadcast its entire received signal to the mobile 15, and then have the mobile 15 cross-correlate the signal from the transmitter 17 and the signal from the reference 10. However, this is wasteful of bandwidth and is a time consuming calculation which tends to limit its real world application. A simpler approach is to look for notable events that can be separately located in the received signals at the reference 10 and the mobile 15. For example, occasional sharp spikes might occur in the transmitted signal 170 & 175), and both receivers can locate and compare the times when the received signal exceeds some threshold. Then the reference only needs to transmit the times at which large spikes occurred, and the mobile can correlate this with its record of when the spikes occurred. The main drawback of this approach is that the events in question may be sensitive to noise, because in a low signal to noise ratio (SNR) environment, significant spikes are more likely to be due to the noise than the signal. Additionally, some signals do not contain identifiable "features," even in high SNR conditions. These deficiencies may be overcome with the block structure of multicarrier modulation of the present invention.

Multicarrier modulation may break up a potentially frequency-selective multipath channel into a bank of narrowband flat fading channels. This may be accomplished in one embodiment by parsing the source data into N parallel lower-rate data streams, and modulating them with a bank of synchronized oscillators at linearly spaced carrier frequencies.

Figure 2:
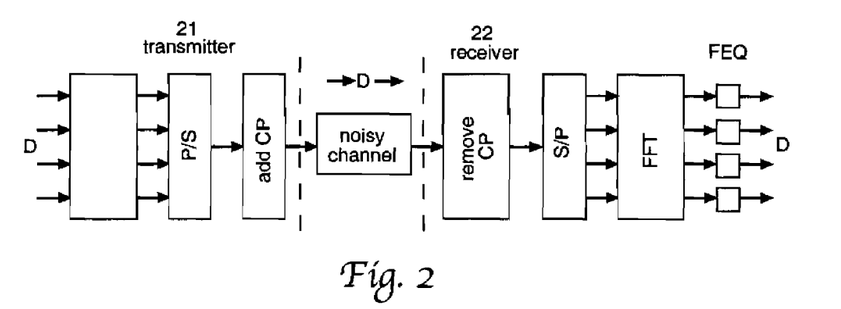
FIG. 2 is a block diagram of a multicarrier transmitter and receiver.

Alternatively, as shown in FIG. 2, we can use an inverse fast Fourier transform IFFT to modulate each successive block of N data samples, convert the output N samples from parallel to serial P/S, and transmit them through the multipath channel. Then, at the receiver, the data is converted from serial to parallel S/P, and passed through a demodulating fast Fourier transform FFT. The transmitted data undergoes a linear convolution with the channel, but it may be made to appear circular by adding a cyclic prefix CP immediately before transmission and removing the cyclic prefix CP immediately after reception. Circular convolution is point-by-point multiplication in the frequency domain, thus the effects of the channel can be inverted via point-by-point multiplication of the fast Fourier transform FFT output and a frequency domain equalizer FEQ. The cyclic prefix CP is uniquely used to aid in determining block boundaries.

A circular convolution in time is essentially equivalent to an element-wise (Hadamard) multiplication in frequency. However, the physical multipath channel induces a linear (not circular) convolution with the transmitted data. One solution may be to make the convolution appear circular by making the transmitted data appear periodic, at least over the duration of each block. This is done by inserting a cyclic prefix (CP) of length v at the start of each block, as shown in FIG. 2.

Figure 3:
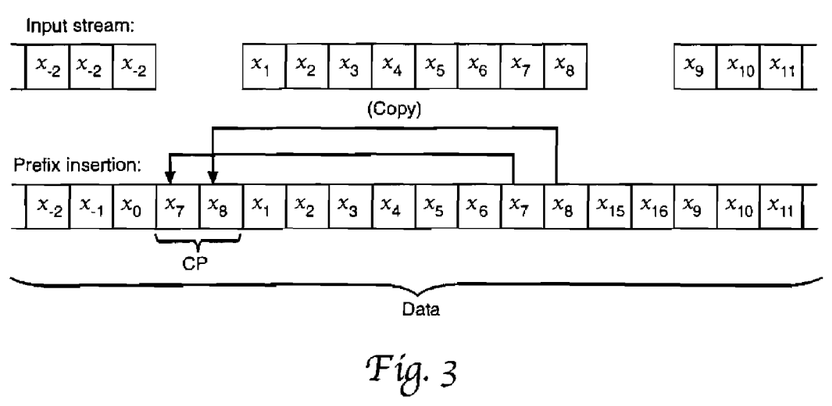
FIG. 3 is an illustration of the insertion of a cyclic prefix (CP) into a data stream for N=8 and v=2.

As shown in FIG. 3, the cyclic prefix CP is a copy of the last v samples of each block, and it extends each block from N to $\overline{M}$=N+v samples. The value of v is preferably at least as large as the delay spread of the multipath channel. FIG. 3 has a v of 2 and an N of 8. If v is as large as the delay, then the last N samples of the extended block that arrives at the receiver appear to be a circular convolution of the original N samples and the multipath channel. Although the cyclic prefix CP was put in place for purposes of multipath mitigation, we can make use of it to ease the TDOA computation as follows:

The discrete-time transmitted data stream is denoted x(i). The redundancy induced by the CP causes the source data to obey $$x(\overline{M}k + i) = x(\overline{M}k + i + N) \qquad (1)$$

$$1 \le i \le v, \quad -\infty \le k \le \infty$$

where k denotes the block index and i is the sample index within the block.

We assume an oversampling factor of P at the receiver and no multipath, so that the sample period $T_s$ is a fraction $1/(P\overline{M})$ of the length of the orthogonal frequency division multiplexing (OFDM) block duration. OFDM is the formal name for a wireless version of multicarrier modulation. Thus we have M=P$\overline{M}$ samples per OFDM block. Hence, incorporating the propagation delays and additive white Gaussian noise, the received signals at the reference and the mobile are $$y_{ref}(i) = x(i - \delta_{ref}) + n_{ref}(i), \quad (2)$$

$$y_{mob}(i) = x(i - \delta_{mob}) + n_{mob}(i).$$

where $\delta_{ref}$ and $\delta_{mob}$, are the propagation delays in samples, and $n_{ref}(i)$ and $n_{mob}(i)$ are the noise values. The powers of the signal, noise at the reference, and noise at the mobile are $\sigma_x^2$, $\sigma_{ref}^2$, and $\sigma_{mob}^2$, respectively. Assuming a sample period of $T_s$ seconds, the TDOA can be written as $$T = (\delta_{mob} - \delta_{ref}) T_s. \quad (3)$$

We may assume that the TDOA is an integer multiple of samples. Fractional TDOA values may be handled by comparing the sampling phase in the two receivers.

The TDOA may be computed from the signals received at the reference receiver and the mobile receiver. The computation may be articulated as a two-step process:

The reference receiver uses the CP to locate the block boundaries within the signal that it receives. Simultaneously and independently, the mobile receiver performs the same task on its received signal.

The reference receiver and the mobile receiver then each compute a single, scalar statistical feature from each block. The reference transmits the feature values and boundary times of the associated blocks to the mobile receiver, which then correlates the sets of feature values in order to line them up.

In conventional communications applications, block synchronization is performed in order to successfully demodulate the data. In the present invention, a similar task is performed in order to transform the TDOA computation from the time scale of samples to the time scale of blocks. The blind block synchronization method provides the maximum likelihood estimate of the block boundaries for a given received block of unknown data (y) to demodulate.

Mathematically:

$$\hat{\delta}_{ML,rx} = \arg\max_{0 \leq m \leq M-1}\left(|\gamma(m)| - \left(\frac{\sigma_x^2}{\sigma_x^2 + \sigma_{rx}^2}\right)\Phi(m)\right) \quad (4)$$

where the subscript "rx" can be replaced by either "ref" or "mob", and where:

$$\gamma(m) = \sum_{i=m+1}^{m+\nu} y_{rx}(i) y_{rx}^*(i+N) \quad (5)$$

$$\Phi(m) = \frac{1}{2} \sum_{i=m+1}^{m+\nu} (|y_{rx}(i)|^2 + |y_{rx}(i+N)|^2) \quad (5a \ \& \ 5b)$$

Equation 5a denotes $\gamma(m)$ which is the prospective CP-to-block correlation and Equation 5b denotes $\Phi(m)$ which denotes the power in the CP plus the power in the end-of-block.

Averaging over many blocks causes the power term $\Phi(m)$ to be nearly constant as a function of m. As a result, it may be omitted. Further, the desired signal component only contributes significantly to the real part of $\gamma(m)$, including the averaging and approximation, replacing the absolute value with a real operator, the estimate of the block boundaries becomes:

$$\hat{\delta}_{ML,rx} = \arg\max_{0 \leq m \leq M-1} \Re\{\gamma_{avg}(m)\} \quad (6)$$

$$\gamma_{avg}(m) = \sum_{k=0}^{K-1} \sum_{i=m+1}^{m+\nu} y_{rx}(Mk+i) y_{rx}^*(Mk+i+N)$$

where $\Re\{\bullet\}$ denotes taking the real part and K is the number of blocks included in the averaging.

There is an ambiguity in this estimate, since at this point one block cannot be identified from another—only the boundaries are known. In a standard communications application, this is not a problem, since synchronization is only performed to be able to demodulate the data, and the value of the delay involved is not of interest in and of itself. However, for TDOA computation, block boundary identification is required using a unique numerical label.

Given the block boundary times, the received signals may be parsed into blocks, with the $k^{th}$ block given by $$y_{rx}(k) = \begin{bmatrix} y_{rx}(Mk + 1 + \hat{\delta}_{ML,rx}) \\ \vdots \\ y_{rx}(Mk + M + \hat{\delta}_{ML,rx}) \end{bmatrix}. \quad (7)$$

A scalar feature for the block may be calculated to label the block and discriminate the block from other arbitrary received blocks. Thus, the values taken on by a desirable feature will vary significantly from block to block. The scalar feature preferably depends on the underlying signal as much as possible and on the noise as little as possible.

Potential candidate features include: Potential candidate features include the first four normalized central Moments (the mean, variance, skewness, and kurtosis), the average symbol's phase, the root-mean-square of the signal, the standard deviation, and the peak-to-average power ratio.

The first four normalized central moments including mean, variance, skewness, and kurtosis in that order.

$$\mu_{rx}(k) = \frac{1}{M} \sum_{i=1}^{M} [y_{rx}(k)]_i \quad (8)$$

$$\sigma_{rx}^2(k) = \frac{1}{M} \sum_{i=1}^{M} |[y_{rx}(k)]_i - \mu_{rx}(k)|^2$$

$$\gamma_{1,rx}(k) = \frac{1}{\sigma_{rx}^3(k)M} \sum_{i=1}^{M} |[y_{rx}(k)]_i - \mu_{rx}(k)|^3$$

$$\gamma_{2,rx}(k) = \frac{1}{\sigma_{rx}^4(k)M} \sum_{i=1}^{M} |[y_{rx}(k)]_i - \mu_{rx}(k)|^4$$

The average symbol's phase may be calculated as:

$$\Phi_{rx}(k) = \operatorname{atan}\left(\frac{\sum_{i=1}^{M} \operatorname{Im}\{[y_{rx}(k)]_i\}}{\sum_{i=1}^{M} \operatorname{Re}\{[y_{rx}(k)]_i\}}\right) \quad (9)$$

The root-mean-square of the signal (preserving phase) may be calculated as:

$$\mathrm{RMS}_{rx}(k) = \sqrt{\frac{1}{M}\sum_{i=1}^{M} ([y_{rx}(k)]_i)^2} \quad (10)$$

The standard deviation (no phase) may be calculated as:

$$\sigma_{rx}(k) = \sqrt{\sigma_{rx}^2(k)} \quad (11)$$

The peak-to-average power ratio may be calculated as:

$$PAPR_{rx}(k) = \frac{\max_{1 \le i \le M} |[y_{rx}(k)]_i|^2}{\frac{1}{M}\sum_{i=1}^{M} |[y_{rx}(k)]_i|^2} \quad (12)$$

The variable $[\cdot]_i$ refers to the $i^{th}$ element of a vector.

The features may also be computed in the frequency domain by discarding the CP, taking the fast Fourier transform (FFT), and then performing the feature computation with respect to the resulting N samples. However, the results may be almost identical to their time-domain counterparts. Many of the features are related, for example the variance and the standard deviation. The reason for considering both of these is that the square of the correlation of the standard deviation is not the same as the correlation of the square of the standard deviation. These differences may contribute to different results.

The reference receiver preferably calculates the value of a particular feature for each of K blocks, then transmits these K values and its estimate $\hat{\delta}_{ref}$ to the mobile receiver. Depending on the feature the values may be real or complex, so the amount of data that needs to be sent is either K or 2K real numbers, plus one integer.

Now the mobile receiver can compute the covariance of the features. Generically denoting the feature values as $f_{ref}(k)$ and $f_{mob}(k)$, the mobile receiver computes:

$$R_F(d) = \sum_{k=1}^{K} (f_{ref}(k) - f_{ref}^{avg}(1)) \cdot (f_{mob}(k+d) - f_{mob}^{avg}(1+d))^* \quad (13)$$

where $$f_{ref}^{avg}(j) = \frac{1}{K}\sum_{k=j}^{j+K-1} f_{ref}(k) \quad (14)$$

Preferably the mobile receiver computes equation 13 for all anticipated valid ranges of the block arrival time difference, say $-D \le d \le D$. The reference receiver computes the feature values for K block's, the mobile receiver must compute them for K+2D blocks. Once equation 13 has been computed over this range, the TDOA can be computed as $$\Delta = \arg\max_{-D \le d \le D} \mathfrak{R}\{R_F(d)\} \quad (15)$$

$$\delta = \hat{\delta}_{mob} - \hat{\delta}_{ref}$$

$$TDOA = (\delta + M\Delta)T_s$$

where $\delta$ is the offset in samples, modulo M; $\Delta$ is the offset in blocks, which accounts for the modulo M ambiguity; and $T_s$ is the sample period.

Note that this procedure includes the oversampled case because M refers to the total number of samples per block. However, the results may alternatively assume Nyquist sampling with similar results.

Increasing K will improve the estimate of the TDOA. However, if the mobile is moving quickly, the true value of the TDOA will change over time, and if too many blocks are used, the TDOA will not be approximately constant within the estimation interval. For example if it is assumed that the reference receiver is stationary and that the mobile is moving at a velocity V. The total length of the estimation interval is $KMT_s$ seconds, and during this time the mobile will move $KMT_sV$ meters. Depending on the geometry, the maximum change in propagation time from the transmitter to the mobile is $\pm KMT_sV/c$ seconds, where c is the speed of light. The worst case scenario may be one in which the mobile receiver is moving directly towards or away from the transmitter.

We would like the total change in TDOA to be much less than the resolution of our sampling, i.e.

$$KMT_s\frac{V}{c} \ll T_s \quad (16)$$

which bounds K by $$KM \ll \frac{c}{V} \quad (16)$$

If the mobile receiver is on an aircraft traveling at the speed of sound, V=343 m/s (or about 767 mph), then KM<<875,000. For a block size of M=80 as used in our simulations, this means that K<<10000 blocks can be used. If M=2560 (among the largest used in existing orthogonal frequency division multiplexing (OFDM) systems), then K<<340 blocks can be used. On the other hand, if we oversample, then the oversampling factor p will be incorporated into M by replacing M with $p\overline{M}$ and the upper bound on K will decrease by a factor of p relative to the example numbers given above.

The bandwidth between the reference receiver and the mobile receiver is preferably as small as possible. For scalability of comparison, the reference-to-mobile bandwidth in terms of the bandwidth used by the transmitted signal of opportunity may be used. The transmitter transmits $\overline{M}$ complex samples per block. The reference receiver transmits one feature value per block, and it may be real or complex. If it is a complex-valued feature, the bandwidth ratio is $$\frac{BW_{ref}}{BW_{tx}} = \frac{1}{\overline{M}}, \quad (17)$$

and for a real-valued feature, it is $$\frac{BW_{ref}}{BW_{tx}} = \frac{1}{2\overline{M}}, \quad (18)$$

Typical values of $\overline{M}$ range from 80 to 2560, hence the proposed technique uses two to three orders of magnitude less bandwidth than the brute force approach of having the reference receiver simply retransmit the data it receives.

At the mobile receiver, the computational complexity of the proposed approach is dominated by three contributions:

computation of $\{\gamma_{avg}(m), 0 \leq m \leq M-1\}$, computation of $\{f_{mob}(k), 1 \leq k \leq K\}$, and computation of $\{R_f(d), -D \leq d \leq D\}$.

The additions and subtractions may be ignored since they are negligible compared to multiplications.

First, consider computation of $\gamma_{avg}$ (m). It is a sum of K dot products of a pair of windows that slides with m. Thus, for the first value of m, Kv complex multiplies are needed. However, as m is incremented, each dot product can be updated by appending and removing one term from each dot product. The elements to be removed have already been computed, hence only a total of K complex multiplies are needed for each additional value of m. Thus, in total, computing $\gamma_{avg}$ (m) requires approximately K(M+v) complex multiplies.

The complexity of the feature computation depends on the feature. The mean is the simplest feature to compute, and it requires a total of about MK complex additions. (Note that in practice we ignore constant scale factors such as 1/M since they scale the signal and noise components equally.) The most complex feature to compute is the kurtosis, which requires about 3MK real multiplies in an efficient implementation (a complex multiply is equivalent to 4 real multiplies). Thus, the complexity of this step can range from negligibility to MK complex multiplies.

The final correlation step requires computing $f_{ref}^{avg}$ and $f_{mob}^{avg}$, which are of negligible complexity. For each value of d, computing $R_f$ (d) requires 2K subtractions followed by K multiplies, for a total of about 2DK multiplies (real or complex depending on the feature). In total, the computational complexity is upper bounded by K (2M+2D+v) complex multiplies. The "mean" feature, which is shown to have the best performance in FIGS. 4, 5 & 6, only requires K(M+2D+v) complex multiplies. Since the total number of samples is KM and since D is typically small compared to M, the total computational complexity is roughly one to two complex multiplies per sample, which is a reasonable level for a realizable system.

A performance analysis via Matlab™ simulations was conducted. The transmitter uses multicarrier modulation with an FT size of N=64, a CP length of v=16, and a block size of M=80, which are consistent with the IEEE 802.11a, HIPER-LAN/2, and MMAC standards for wireless LANs. Throughout, we assume that the CP correlation is 100% accurate, since as many symbols as needed may be used without increasing the bandwidth from the reference to the mobile; thus; the bottleneck is the accuracy of the feature correlation.

When computing and looking for the peak value at the desired delay, there was a spike at the correct location but it was not always the global maximum of the function $R_F$(d). In order to magnify the desired spike, the function $R_F$ (d) was convolved with a simple high pass second-order difference filter, with impulse response (−1, 2, −13). This made the desired peak more prominent.

Figure 4:
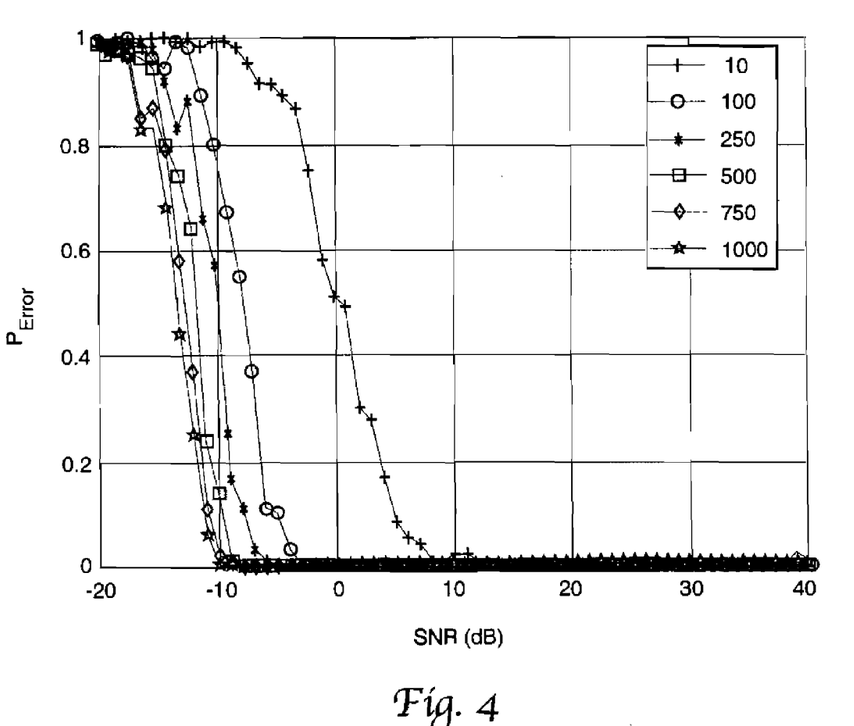
FIG. 4 is an example of a graph of the probability of synchronization error vs. the signal to noise ratio (SNR) for the mean feature.
Figure 5:
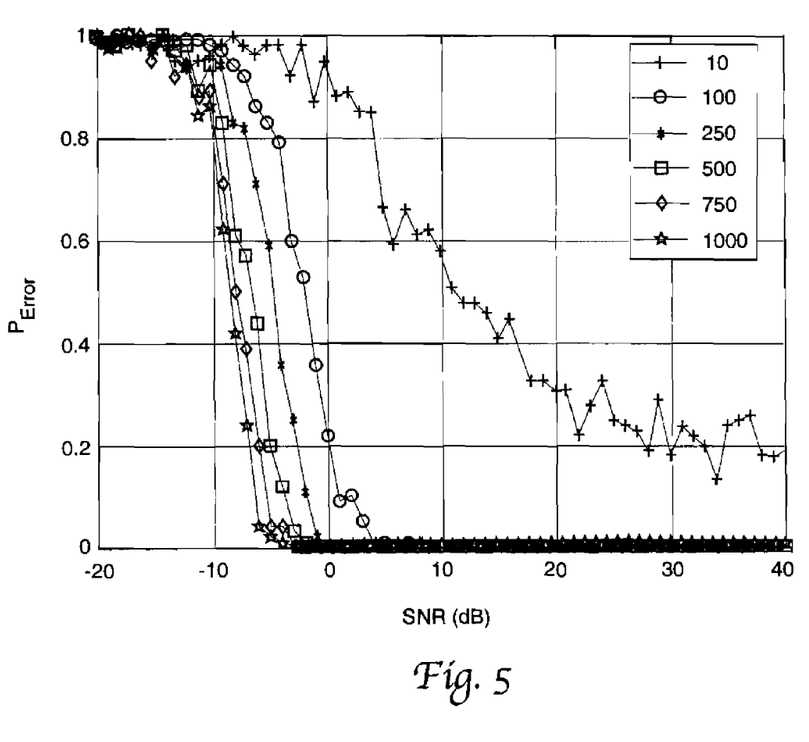
FIG. 5 is an example of a graph of the probability of synchronization error vs. the signal to noise ratio (SNR) for the phase feature.
Figure 6:
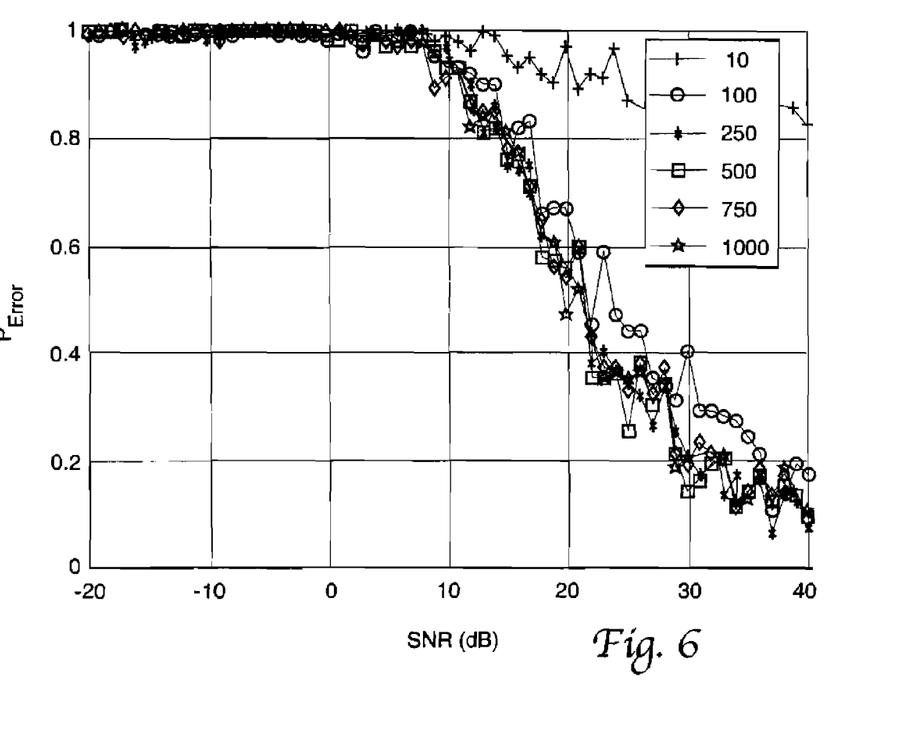
FIG. 6 is an example of a graph of the probability of synchronization error vs. the signal to noise ratio (SNR) for the skewness feature.

Plots of the probability of correctly determining the overall TDOA are given in FIG. 4, FIG. 5, and FIG. 6. FIG. 4 is one example of a graph of the probability of synchronization error vs. the Signal to Noise Ratio for the mean data (the best results). FIG. 5 is one example of a graph of the probability of synchronization error vs. the Signal to Noise Ratio for the phase data (moderate performance results). FIG. 6 is on example of a graph of the probability of synchronization error vs. the Signal to Noise Ratio for the skewness data (poor performance results). Performance of the variance, standard deviation, RMS, and peak-to-average power ratio was comparable to that of the phase; and performance of the kurtosis was comparable to that of the skewness.

In these simulations, $\sigma_{ref}^2 = \sigma_{mob}^2$ and SNR=$\sigma_x^2/\sigma_{ref}^2$. For the "mean" feature, synchronization is achieved 95% of the time at 10 dB SNR with only 10 blocks. If 100 blocks are available, synchronization is almost always achieved at −3 dB SNR; and if 1000 blocks are available, synchronization is almost always achieved at −10 dB SNR. If only a limited number of blocks are available, these results may be improved by combining several features into the correlator. This would allow a tradeoff between the bandwidth used between the reference and the mobile and the synchronization performance.

Multicarrier modulation can be used to perform accurate TDOA computation with an SNR as low as −3 dB when 100 blocks are available. No training signal was required, although we did assume knowledge of the block structure of the transmitted signal. The only communication required between the reference and the mobile for this level of performance was the transmission of 100 complex numbers and one integer over the course of the 100 block (8000 sample) time window, hence the bandwidth from the reference to the mobile was almost two orders of magnitude smaller than the bandwidth of the signal of opportunity.

In many broadcast multicarrier systems (e.g. the terrestrial repeaters for satellite radio or European digital television), multiple transmitters each transmit the same signal. This cannot be done with single carrier systems because it creates multipath in the received signal. However, multicarrier systems are very robust to multipath. The result is that the reference receiver may no longer be needed.

In addition to multiple transmitters with reference receivers, multicarrier signals of opportunity can be combined with an inertial navigation system (INS) to remove the need for a reference receiver.

INS systems are strong candidates for non-GPS navigation because they have high accuracy over short periods of time. However, they are subject to gradual drift. The use of a signal of opportunity can check this drift. Specifically, an INS may be used to obtain multiple relative position estimates at relative times. The receiver can locate the start of each multicarrier block in blind fashion by looking for the repetition induced by the cyclic prefix of multicarrier systems. The receiver can compare the measured reception times of sequential blocks to the known block length, and a change in the expected vs. measured time indicates if the receiver is moving towards or away from a given transmitter. With about 6 or more transmitters, a position track can be obtained.

Figure 7:
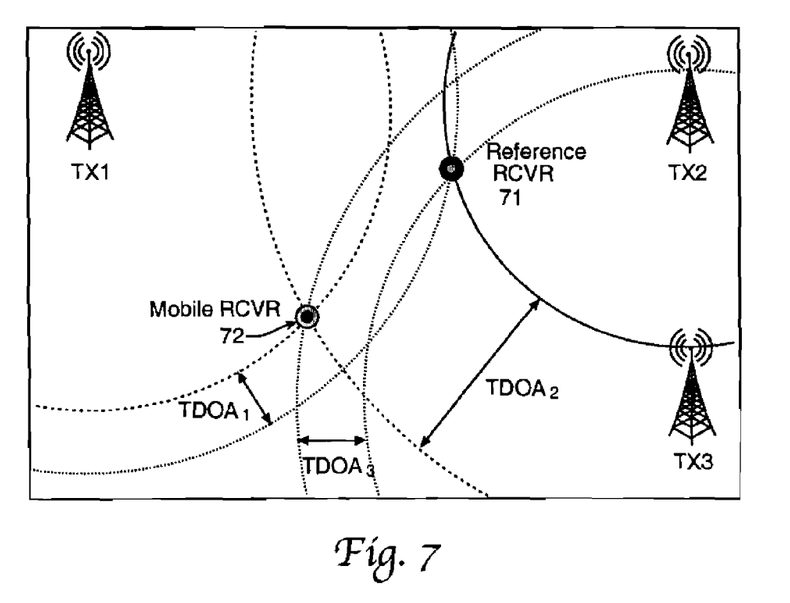
FIG. 7 is an illustration of Time Difference of arrival (TDOA) using multiple transmitters.

FIG. 7 shows an illustration of one embodiment of the present invention using multiple transmitters of opportunity TX1, TX2 & TX3, a mobile receiver 72 and a reference receiver 71. Transmitter TX1 has a time difference of arrival $TDOA_1$. Transmitter TX 2 has a time difference of arrival $TDOA_2$. Transmitter TX 3 has a time difference of arrival $TDOA_3$. Such triangulation of signals Way be used to improve the accuracy and/or speed of calculations. Further, it is envisioned that with three or more transmitters in known locations, it may be possible to use the present invention without a reference receiver. The calculations disclosed above would be used with the transmitters to triangulate the mobile receiver location.

While specific embodiments have been described in detail in the foregoing description and illustrated in the drawings, those with ordinary skill in the art may appreciate that various modifications to the details provided could be developed in light of the overall teachings of the disclosure.

What is claimed is:

1. A method of multicarrier modulation position determination including:
    deploying at least one known receiver with a known location;
    deploying a second receiver with an unknown location;
    obtaining at least two signals of opportunity by both the known receiver and the second receiver; the signals generated by at least two transmitters with different locations; the signals having a plurality of block data, the block data having block boundaries,
        the block boundaries including a beginning block boundary and an end block boundary,
        the block data further including a cyclic prefix at the beginning block boundary;
    acquiring a plurality of data samples for at least a portion of the block data;
    correlating the obtained signals of opportunity between the receivers, the correlating process including calculating a time difference of arrival between the known receiver and the second receiver;
    the time difference of arrival calculated by
        aligning the block boundaries and,
        computing a single scalar statistical feature associated with each block data to create a plurality of scalar statistical features,
        correlating the plurality of scalar features between the receivers to calculate a time difference of arrival for the known receiver and the second receiver;
    calculating the location of the second receiver using the time difference of arrival.

2. The method of claim 1 wherein the scalar statistical feature of the block is a mean of the data samples acquired.

3. The method of claim 1 wherein the known receiver transmits one feature value per block.

4. The method of claim 3 wherein the feature value may be real or complex.

5. The method of claim 1 wherein the scalar statistical feature of the block includes a mean, an average symbol phase, a root-mean-square of the signal, a standard deviation of the peak-to-power ratio, or a combination thereof.

* * * * *